(12) United States Patent
Kolb et al.

(10) Patent No.: US 9,957,995 B2
(45) Date of Patent: May 1, 2018

(54) POWER-OPERATED TIGHTENING NUT

(71) Applicant: Ludwig Ehrhardt GmbH, Laubach (DE)

(72) Inventors: Nils Kolb, Burbach (DE); Thomas Willingshofer, Bad Laasphe (DE)

(73) Assignee: LUDWIG EHRHARDT GMBH, Laubach (DE)

(*) Notice: Subject to any disclaimer, the term of this patent is extended or adjusted under 35 U.S.C. 154(b) by 0 days. days.

(21) Appl. No.: 15/031,774

(22) PCT Filed: Sep. 26, 2014

(86) PCT No.: PCT/EP2014/002629
§ 371 (c)(1),
(2) Date: Apr. 25, 2016

(87) PCT Pub. No.: WO2015/062688
PCT Pub. Date: May 7, 2015

(65) Prior Publication Data
US 2016/0265575 A1    Sep. 15, 2016

(30) Foreign Application Priority Data
Oct. 30, 2013  (DE) .......... 10 2013 018 241

(51) Int. Cl.
*F16B 31/02* (2006.01)
*F16B 37/08* (2006.01)

(52) U.S. Cl.
CPC ............ *F16B 31/028* (2013.01); *F16B 31/02* (2013.01); *F16B 37/08* (2013.01)

(58) Field of Classification Search
CPC ........ F16B 31/02; F16B 31/028; F16B 31/04; F16B 37/08; F16B 37/0857; F16B 37/0864
USPC .......................................... 411/432, 433, 917
See application file for complete search history.

(56) References Cited

U.S. PATENT DOCUMENTS

| | | | |
|---|---|---|---|
| 2,110,537 A * | 3/1938 | Tautz ................... | B23Q 16/001 33/655 |
| 2,664,768 A * | 1/1954 | Clyne .................. | B23Q 16/001 33/430 |
| 3,789,726 A | 2/1974 | Gill et al. | |
| 3,830,133 A * | 8/1974 | Jepsen .................... | F16B 37/00 411/432 |
| 4,326,826 A * | 4/1982 | Bunyan ................. | B23P 19/067 411/339 |

(Continued)

FOREIGN PATENT DOCUMENTS

DE          2950254 A1      6/1981

OTHER PUBLICATIONS

ENEMAC GmbH, "Mechanical Clamping Elements", ENEMAC. de Maschinentechnik (2010).

(Continued)

*Primary Examiner* — Roberta S Delisle
(74) *Attorney, Agent, or Firm* — Caesar Rivise, PC

(57) ABSTRACT

The invention relates to a power-operated tightening nut (1) for axially tightening a fastening bolt, using an adjusting system (1) for adjusting the tightening force acting on the fastening bolt (2). The invention further provides an integrated display (24) for displaying the tightening force acting on the fastening bolt (2).

19 Claims, 3 Drawing Sheets

(56) References Cited

U.S. PATENT DOCUMENTS

| | | | | | |
|---|---|---|---|---|---|
| 4,622,730 | A | * | 11/1986 | Steinbock | B21B 27/035 403/320 |
| 4,693,656 | A | * | 9/1987 | Guthrie | F16B 21/16 408/241 S |
| 4,787,794 | A | * | 11/1988 | Guthrie | F16B 7/14 269/181 |
| 4,927,305 | A | * | 5/1990 | Peterson, Jr. | F16B 31/025 403/16 |
| 4,968,201 | A | * | 11/1990 | Frizot | B25B 23/10 411/14.5 |
| 5,046,906 | A | * | 9/1991 | Bucknell | B25B 29/02 411/432 |
| 5,069,587 | A | * | 12/1991 | Levenstein | F16D 1/06 29/456 |
| 5,468,106 | A | * | 11/1995 | Percival-Smith | F16B 31/043 277/649 |
| 2002/0054809 | A1 | | 5/2002 | Fischer | |
| 2013/0108391 | A1 | * | 5/2013 | Ramberger | F16B 31/04 411/147 |

OTHER PUBLICATIONS

English language abstract of DE 2950254 A1 (1981).
International Search Report for PCT/EP2014/002629 dated Dec. 15, 2014.

\* cited by examiner

Section B-B

Section A-A

POWER-OPERATED TIGHTENING NUT

BACKGROUND OF THE INVENTION

The invention relates to a power-operated tightening nut for axially tightening a fastening bolt with an adjustable tightening force.

From the prior art (e.g. product sheet "Mechanical tightening elements" of Enemac GmbH from 2010), such power-operated tightening nuts which are used in tightening technology are known for tightening a fastening bolt axially. For this the power-operated tightening nut is manually screwed onto an external thread of the fastening bolt to be tightened until the power-operated tightening nut rests with its front side contact surface on a corresponding counter-bearing surface. Subsequently, an adjusting screw in the power-operated tightening nut is tightened with a specified torque using a torque wrench, the torque of the adjusting screw determining the tightening force acting on the fastening bolt.

A disadvantage of this known power-operated tightening nut is the fact that the tightening force acting on the fastening bolt can only be derived from the torque which is applied to the adjusting screw. For accurately tightening the fastening bolt with a specified tightening force, a torque wrench is therefore always required for the known power-operated tightening nuts.

Thus the object of the invention is to create an appropriately improved power-operated tightening nut.

This object is achieved by a power-operated tightening nut according to the invention.

SUMMARY OF THE INVENTION

Firstly, in conformity with the prior art, the power-operated tightening nut according to the invention has an adjusting device (e.g. adjusting screw with corresponding gear mechanism) for adjusting the tightening force acting on the fastening bolt.

In addition, however, unlike the prior art, the power-operated tightening nut according to the invention has a display for displaying the tightening force acting on the fastening bolt. This is advantageous because there is no longer any need for a torque wrench to tighten the fastening bolt with a specified tightening force since the tightening force is indicated immediately by the power-operated tightening nut's display.

In a preferred embodiment of the invention, the power-operated tightening nut has a housing pot with a contact surface on the front side, the contact surface of the housing pot resting on a corresponding counter-bearing surface during tightening. Moreover, the housing pot has a hole on the front side through which the fastening bolt can be inserted into the housing pot with its free end.

A threaded portion which can be screwed onto the fastening bolt is preferably provided in the housing pot, the threaded portion being rotatable and axially movable in said housing pot. The threaded portion of the power-operated tightening nut preferably has an internal thread which can be screwed onto a corresponding external thread of the fastening bolt.

In addition, the power-operated tightening nut preferably has a spring (e.g. disc spring) which axially pretightens the threaded portion relative to the housing pot such that the axial position of the threaded portion determines the tightening force acting on the fastening bolt.

During a tightening process, the threaded portion is thus rotated in the housing pot until the axial position of said threaded portion in the housing pot tensions the spring so far that the spring exerts the desired tightening force on the fastening bolt.

The display for displaying the tightening force acting on the fastening bolt preferably has a housing outer part visible from the outside, the housing outer part being axially movable relative to the housing pot. The housing outer part visible from the outside is joined in this case to the threaded portion such that the axial position of the housing outer part reflects the axial position of the internally located threaded portion and therefore the tightening force acting on the fastening bolt.

In addition, the display preferably has a scale which is mounted on the lateral surface of the housing pot and enables the axial position of the housing outer part to be read off. During a tightening process, the housing pot and the housing outer part push together in the axial direction, the axial position of the housing outer part relative to the housing pot reflecting the tightening force acting on the fastening bolt. In the simplest case, the scale consists merely of a single mark which indicates that the specified nominal tightening force has been reached. The scale may, however, consist of several marks (e.g. graduations) so that not only is it possible to indicate that the nominal tightening force has been reached but it is also possible to read off the current quantitative value of said tightening force.

It has already been mentioned briefly above that the power-operated tightening nut according to the invention has an adjusting device which enables setting of the tightening force acting on the fastening bolt. This adjusting device preferably comprises a rotatable adjusting screw accessible from the outside in addition to a transmission gear for translating a rotary movement of the adjusting screw into a rotary movement of the threaded portion. A rotation of the adjusting screw thus leads to a corresponding rotation of the threaded portion and therefore to screwing of the threaded portion onto the fastening bolt which in turn tensions the spring and as a result exerts a corresponding tightening force on the fastening bolt.

In the preferred embodiment of the invention, the rotatable threaded portion has a ring gear with internally located longitudinal teeth into which corresponding longitudinal teeth of the eccentrically arranged adjusting screw engage. The adjusting screw thus turns the ring gear via its longitudinal teeth and therefore also the rotatable threaded portion resulting in corresponding tensioning of the spring. In addition, this arrangement with a ring gear and an eccentrically arranged adjusting screw also enables a high transmission ratio such that high tightening forces can be realized with a relatively low torque of the adjusting screw.

In the preferred embodiment of the invention, the threaded portion in the housing pot has a specific maximum axial travel, i.e. the threaded portion is movable in the axial direction inside the housing pot within said maximum travel. In this case the longitudinal teeth of the adjusting screw and the longitudinal teeth of the ring gear have a tooth engagement with a specific axial length, the axial length of the tooth engagement being so large that the longitudinal teeth of adjusting screw and ring gear remain in engagement within the entire axial travel of the threaded portion.

It should also be mentioned that the housing pot preferably has an aperture in its lateral surface, a connecting element (e.g. bolt) extending radially through said aperture and joining the housing outer part to the threaded portion such that the axial position of said housing outer part immediately reflects the axial position of said threaded portion and therefore also the spring force. In this case the aperture in the lateral surface of the housing pot has an axial extension which enables corresponding axial travel of the housing outer part.

In the preferred embodiment of the invention, the threaded portion has an annular groove in its outer lateral surface which runs around the entire circumference of the threaded portion. The aperture in the lateral surface of the housing pot, on the other hand, is preferably a longitudinal cut running axially. In this case the connecting element (e.g. bolt) between the housing outer part and the threaded portion is preferably firmly attached on the inside of the housing part and protrudes through the elongated slot in the lateral surface of the housing pot into the annular groove in the threaded portion. On the one hand, this prevents a rotary movement of the housing outer part relative to the housing pot since the elongated slot prevents a rotary movement of the connecting element and therefore also of the housing outer part. On the other hand, this construction enables an axial movement of the housing outer part relative to the housing pot since the connecting element is movable in the elongated slot. Moreover, this construction also enables a rotary movement of the threaded portion relative to the housing outer part as the connecting member protrudes into the annular groove in the threaded portion and as a result does not impede a rotary movement of said threaded portion.

Additionally in this case, the connecting element between the housing outer part and the threaded portion is preferably formed by at least one bolt which is driven flush into a hole in the lateral surface of the housing outer part from the outside and protrudes radially inwards through the elongated slot into the annular groove in the threaded portion.

The adjusting screw already mentioned above is preferably rotatably supported in a housing inner part, the housing inner part being inserted into the housing pot. At its free end the adjusting screw preferably has a circlip to secure the adjusting screw axially in the housing inner part.

It should also be mentioned that the connection between the housing inner part and the housing pot is made preferably by at least one bolt which is driven flush into a hole in the wall of said housing pot from the outside and protrudes radially inwards into said housing inner part.

It has already been mentioned above that the actual tightening force is applied by means of a spring which pretensions the housing pot, resting with its front side on the counter-bearing surface, relative to the threaded portion together with the fastening bolt screwed therein. This spring preferably has at least one disc spring.

It should be mentioned in addition that the rotatable threaded portion preferably has a radially projecting and annularly encircling collar, the spring (e.g. disc spring) being supported, on the one hand, on the collar of said threaded portion and, on the other hand, on the base of the housing pot.

It should also be mentioned that the spring in the maximally tensioned state preferably exerts a tightening force of at least 10 kN, 20 kN, 40 kN, 60 kN, 100 kN or 150 kN on the threaded portion and therefore on the fastening bolt.

To facilitate manual screwing of the power-operated tightening nut onto the fastening bolt before the actual start of the tightening process, a gripping surface is preferably provided which is applied to the outer lateral surface of the housing outer part and/or the housing pot, wherein the gripping surface may include knurling.

It should also be mentioned that the transmission gear between the adjusting screw and the rotatable threaded portion preferably has a transmission ratio of at least 1:2, 1:3, 1:5, 1:10 in order to achieve a relatively large value of the tightening force acting on the fastening bolt with a relatively small torque of the adjusting screw.

Furthermore, it should be mentioned that an antifriction bearing, which supports the rotatable threaded portion in the housing inner part, may be arranged between said rotatable threaded portion and said housing inner part.

Moreover, it should be mentioned that the threaded portion, the housing pot, the spring, the fastening bolt and the housing outer part are preferably arranged coaxially.

It should additionally be mentioned with regard to the display that the tightening force acting on the fastening bolt is preferably indicated visually and/or haptically.

BRIEF DESCRIPTION OF SEVERAL VIEWS OF THE DRAWINGS

Other advantageous developments of the invention will be described in greater detail below with reference to the figures together with the description of the preferred embodiment of the invention. The drawings show.

DETAILED DESCRIPTION OF PREFERRED EMBODIMENTS

Figure 1:
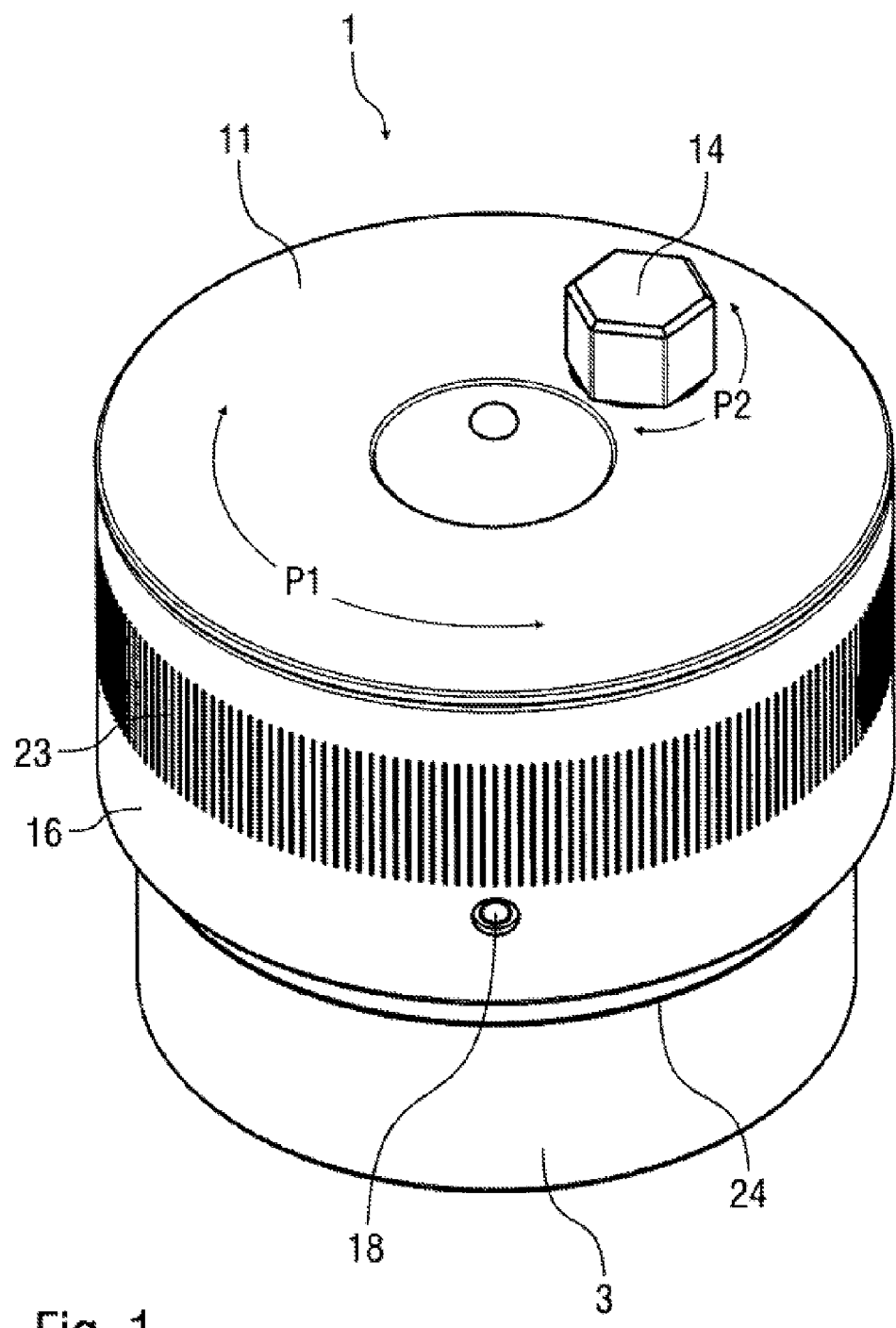
FIG. 1 a perspective view of a power-operated tightening nut according to the invention, FIG. 2 a plan view of the power-operated tightening nut according to the invention according to FIG. 1, FIG. 3 a lateral view of the power-operated tightening nut from FIGS. 1 and 2, FIG. 4 a cross-sectional view of the power-operated tightening nut from FIG. 2 along the section line B-B, and FIG. 5 a sectional view of the power-operated tightening nut according to FIG. 2 along the section line A-A.
Figure 2:
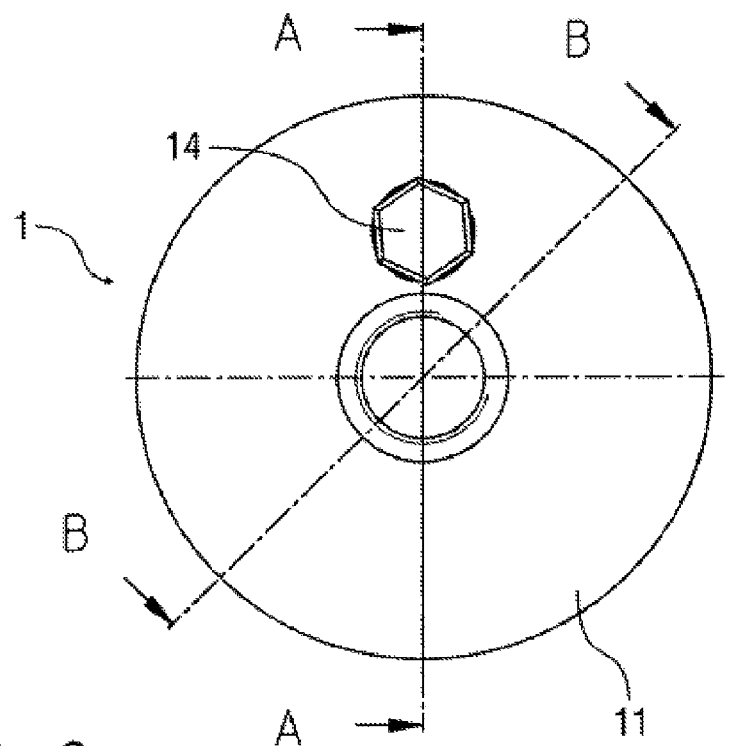
Figure 3:
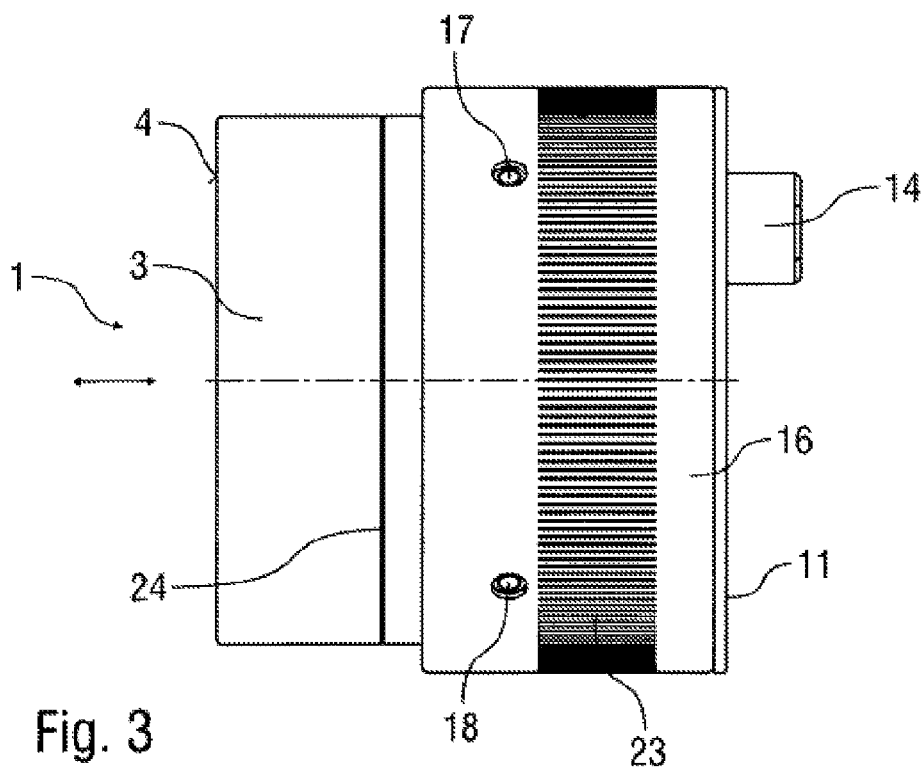
Figure 4:
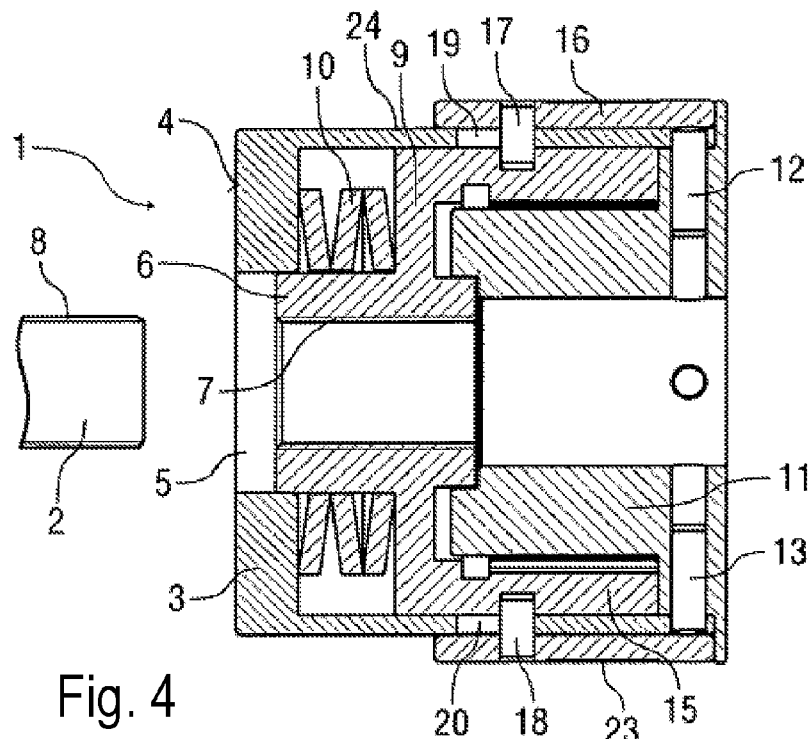
Figure 5:
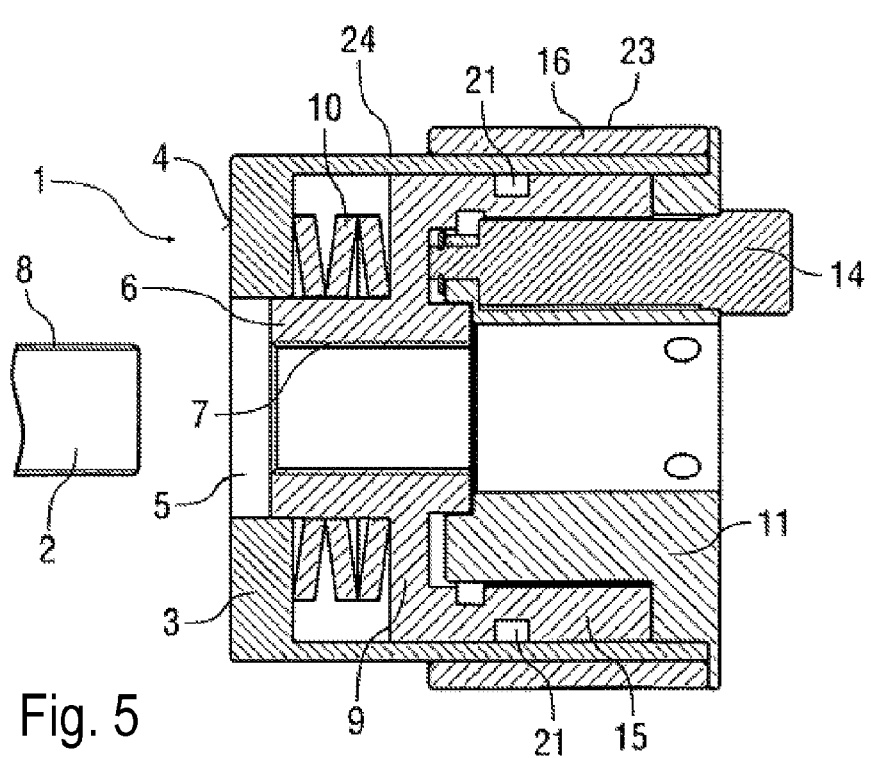

The drawings show a preferred embodiment of a power-operated tightening nut 1 according to the invention, which can be used in tightening technology to tighten a fastening bolt 2 with an adjustable axial tightening force.

The power-operated tightening nut 1 initially has a housing pot 3 with a front side contact surface 4 which rests on a corresponding counter-bearing surface, not illustrated, during a tightening process.

Moreover, the housing pot has a hole 5 centrally in its base into which the fastening bolt 2 can be inserted with its free end.

Located in the housing pot 3 is a threaded portion 6 having an internal thread 7 which can be screwed onto a corresponding external thread 8 of the fastening bolt 2, as will be described in detail.

The threaded portion 6 has on its outer lateral surface an annularly encircling collar 9, a disc spring 10 being disposed between the collar 9 and the base of the housing pot 3. The disc spring 10 thus rests, on the one hand, on the base of the housing pot 3 and, on the other hand, on the collar 9 of the threaded portion 6.

Furthermore, a housing inner part 11 is inserted into the housing pot 3, the inner housing part 11 being fixed in said housing pot 3 by bolts 12, 13. For this the housing pot 3 has radial holes in its lateral surface, the bolts 12, 13 being driven flush through the radial holes in the wall of the housing pot 3 into corresponding blind holes running radially in the housing inner part 11.

An adjusting screw 14, which is used to turn the threaded portion 6, is inserted into the housing inner part 11 and as a result tensions the disc spring 10 and therefore also the fastening bolt 2 with an adjustable tightening force. For this the adjusting screw 14 has longitudinal teeth in its lateral surface.

Furthermore, a ring gear 15, which also has internally located longitudinal teeth, is integrally formed on the threaded portion 6. The longitudinal teeth of the adjusting screw 14 thus engage in the longitudinal teeth of the ring gear 15 of the threaded portion 6 such that a rotation of the adjusting screw 14 leads to a corresponding rotation of the ring gear 15 and therefore also of the threaded portion 6.

Moreover, the power-operated tightening nut has a housing outer part 16 which is joined to the threaded portion 6 via bolts 17, 18 such that the axial position of the housing outer part 16 reflects the axial position of the threaded portion 6 and therefore also the tightening force acting on the fastening bolt 2. The bolts 17, 18 each protrude through an axially elongated slot 19 or 20 respectively in the wall of the housing pot 3 radially inwards into an annular groove 21 in the lateral surface of the ring gear 15.

This construction enables an axial movement of the housing outer part 16 together with the threaded portion 6.

At the same time, this construction enables a rotary movement of the threaded portion 6 relative to the housing outer part 16 as the bolts 17, 18 can move freely in the annular groove 21.

Finally, this construction prevents a rotary movement of the housing outer part 16 as the elongated slots 19, 20 prevent a rotary movement of the bolts 17, 18 and therefore of the housing outer part 16.

Located on the lateral surface of the housing outer part 16 is a circumferential knurling 23 which initially makes it possible to screw the power-operated tightening nut 1 on manually.

A tightening process of the power-operated tightening nut 1 will now be described below.

For this the power-operated tightening nut 1 is initially screwed manually onto the fastening bolt 2 until the contact surface 4 on the front side of the housing pot 3 rests on a corresponding counter-bearing surface, not illustrated. This manual screwing on of the power-operated tightening nut 1 is made easier by the knurling 23 on the lateral surface of the housing outer part 16.

Subsequently, the adjusting screw 14 is then tightened with a conventional monkey wrench. During this tightening process, the housing pot 3 and the housing outer part 16 slide axially into each other. The tightening process is then continued by turning the adjusting screw 14 until the housing outer part 16 reaches a mark 24 on the lateral surface of the housing pot 3. The specified nominal tightening force is then reached. Thus during tightening of the adjusting screw 14, no torque wrench is necessary as the user can easily see that the nominal tightening force is reached when the edge of the housing outer part 16 reaches the mark 24.

During a tightening process, therefore, two rotary movements take place one after the other, namely on the one hand a manual rotary movement of the complete power-operated tightening nut 1 along the direction of rotation P1 (cf. FIG. 1) and a subsequent rotary movement of the adjusting screw 14 along the direction of rotation P2 (cf. FIG. 1).

The invention is not restricted to the preferred embodiment described above. Rather, a large number of variants and modifications are possible which likewise make use of the inventive idea and therefore fall within the scope of protection. In particular, the invention also claims protection for the object and the features of the dependent claims regardless of the claims referred to.

LIST OF REFERENCE NUMBERS

1 Power-operated tightening nut
2 Fastening bolt
3 Housing pot
4 Contact surface of power-operated tightening nut
4 Hole in housing pot
6 Threaded portion
7 Internal thread of threaded portion
8 External thread of fastening bolt
9 Collar on threaded portion
10 Disc spring
11 Housing inner part
12 Bolt for joining housing pot and housing inner part
13 Bolt for joining housing pot and housing inner part
14 Adjusting screw
15 Ring gear of threaded portion
16 Housing outer part
17 Bolt for axial joining of housing outer part and threaded portion
18 Bolt for axial joining of housing outer part and threaded portion
19 Longitudinal slot in wall of housing pot
20 Longitudinal slot in wall of housing pot
21 Annular groove in threaded portion
23 Knurling on housing outer part
24 Mark
P1 Direction of rotation of power-operated tightening nut during manual screwing or unscrewing
P2 Direction of rotation of the adjusting screw during tightening or loosening

The invention claimed is:

1. A power-operated tightening nut for axially tightening a fastening bolt with an adjustable tightening force, comprising:
   an adjusting device for adjusting the tightening force acting on the fastening bolt; and
   a display for displaying the tightening force acting on the fastening bolt,
   wherein an axial position of the display relative to the fastening bolt reflects the tightening force acting on the fastening bolt.

2. The power-operated tightening nut according to claim 1, further comprising
   a housing pot having a contact surface on a front side for resting against a counter-bearing surface and having a hole on the front side for insertion of the fastening bolt into the housing pot, and
   a threaded portion for screwing onto the fastening bolt, wherein the threaded portion is arranged in the housing pot and is rotatable and axially movable in said housing pot, and
   a spring which axially pretightens the threaded portion relative to the housing pot such that an axial position of the threaded portion determines the tightening force acting on the fastening bolt.

3. The power-operated tightening nut according to claim 2, wherein
   the display has a housing outer part visible from outside,
   the housing outer part is axially movable relative to the housing pot, and
   the housing outer part is joined to the threaded portion such that an axial position of the housing outer part reflects the axial position of the threaded portion and therefore the tightening force acting on the fastening bolt.

4. The power-operated tightening nut according to claim 3, wherein the display has a scale which is mounted on a lateral surface of the housing pot and enables the axial position of the housing outer part to be read off.

5. The power-operated tightening nut according to claim 3, wherein
the housing pot has an aperture in its lateral surface,
a connecting element, which connects the housing outer part to the threaded portion, extends through the aperture, and
the aperture in the lateral surface of the housing pot has an axial extension which enables corresponding axial travel of the housing outer part.

6. The power-operated tightening nut according to claim 5, wherein
the threaded portion has an annular groove in its outer lateral surface,
the aperture in the lateral surface of the housing pot is an elongated slot running axially, and
the connecting element is firmly attached on the inside of the housing outer part and protrudes through the elongated slot in the lateral surface of the housing pot into the annular groove in the threaded portion such that
a rotary movement of the housing outer part relative to the housing pot is prevented,
an axial movement of the housing outer part relative to the housing pot is possible, and
a rotary movement of the threaded portion relative to the housing outer part is possible.

7. The power-operated tightening nut according to claim 6, wherein the connecting element has at least one bolt which is driven flush into a hole in the lateral surface of the housing outer part from the outside and protrudes radially inwards into the annular groove in the threaded portion.

8. The power-operated tightening nut according to claim 3, wherein at least one of the housing outer part and the housing pot has a knurling in its outer lateral surface serving as a gripping surface.

9. The power-operated tightening nut according to claim 3, wherein the threaded portion, the housing pot, the spring, the fastening bolt and the housing outer part are arranged coaxially.

10. The power-operated tightening nut according to claim 2, wherein the spring in a maximally tensioned state exerts a tightening force of at least 10 kN on the threaded portion and therefore on the fastening bolt.

11. The power-operated tightening nut according to claim 1, wherein the display visually displays the tightening force acting on the fastening bolt.

12. The power-operated tightening nut according to claim 1, wherein the display haptically displays the tightening force acting on the fastening bolt.

13. A power-operated tightening nut for axially tightening a fastening bolt with an adjustable tightening force, comprising:
an adjusting device for adjusting the tightening force acting on the fastening bolt;
a display for displaying the tightening force acting on the fastening bolt;
a housing pot having a contact surface on a front side for resting against a counter bearing surface and having a hole on the front side for insertion of the fastening bolt into the housing pot;
a threaded portion for screwing onto the fastening bolt, wherein the threaded portion is arranged in the housing pot and is rotatable and axially movable in said housing pot; and
a spring which axially pretightens the threaded portion relative to the housing pot such that an axial position of the threaded portion determines the tightening force acting on the fastening bolt,
wherein the adjusting device comprises a rotatable adjusting screw accessible from the outside in addition to a transmission gear for translating a rotary movement of the adjusting screw into a rotary movement of the threaded portion.

14. The power-operated tightening nut according to claim 13, wherein
the rotatable threaded portion has a ring gear with internally located longitudinal teeth,
the adjusting screw is arranged eccentrically inside the ring gear and has externally located longitudinal teeth, and
the longitudinal teeth of the adjusting screw engage in the longitudinal teeth of the ring gear.

15. The power-operated tightening nut according to claim 14, wherein
the threaded portion has a specific axial maximum travel,
the longitudinal teeth of the adjusting screw and the longitudinal teeth of the ring gear have a tooth engagement with a specific axial length, and
the axial length of the tooth engagement is greater than the maximum travel of the threaded portion so that the tooth engagement between the adjusting screw and the ring gear persists in every axial position of the threaded portion.

16. The power-operated tightening nut according to claim 13, wherein
the adjusting screw is rotatably supported in a housing inner part, and
the adjusting screw has a circlip on a free end thereof to secure the adjusting screw axially, and
the housing inner part is inserted into the housing pot and firmly connected to said housing pot by at least one bolt, which is driven flush into a hole in the wall of the housing pot from the outside and protrudes radially inwards into the housing inner part.

17. The power-operated tightening nut according to claim 13, wherein the spring for pretightening the threaded portion relative to the housing pot comprises at least one disc spring.

18. The power-operated tightening nut according to claim 13, wherein the transmission gear has a transmission ratio of at least 1:2 in order to achieve a relatively large value of the tightening force acting on the fastening bolt with a relatively small torque of the adjusting screw.

19. A power-operated tightening nut for axially tightening a fastening bolt with an adjustable tightening force, comprising:
an adjusting device for adjusting the tightening force acting on the fastening bolt;
a display for displaying the tightening force acting on the fastening bolt;
a housing pot having a contact surface on a front side for resting against a counter bearing surface and having a hole on the front side for insertion of the fastening bolt into the housing pot;
a threaded portion for screw ing onto the fastening bolt, wherein the threaded portion is arranged in the housing pot and is rotatable and axially movable in said housing pot; and a spring which axially pretightens the threaded portion relative to the housing pot such that an axial position of the threaded portion determines the tightening force acting on the fastening bolt, wherein the rotatable threaded portion has a radially projecting and annularly encircling collar, wherein the spring is supported, on the one hand, on the collar of the threaded portion and, on the other hand, on a base of the housing pot.

* * * * *